May 14, 1968  F. WITSCHI ET AL  3,382,542
MACHINE FOR THE PRODUCTION OF CYLINDRICAL
COTTON BODIES AND THE LIKE
Filed May 7, 1965  2 Sheets-Sheet 1

Inventors
Fritz Witschi
Max Bünzli
By
Karl W. Flocks
attorney

May 14, 1968  F. WITSCHI ET AL  3,382,542
MACHINE FOR THE PRODUCTION OF CYLINDRICAL
COTTON BODIES AND THE LIKE

Filed May 7, 1965  2 Sheets-Sheet 2

Inventors
Fritz Witschi
Max Bünzli
By
Karl W. Flocks
Attorney

United States Patent Office 3,382,542
Patented May 14, 1968

3,382,542
MACHINE FOR THE PRODUCTION OF CYLINDRICAL COTTON BODIES AND THE LIKE
Fritz Witschi, Uhwiesen, Zurich, and Max Bunzli, Neuhausen am Rheinfall, Switzerland, assignors to IVF Verbandsloffmaschinen-Fabrik Schaffhausen, Schaffhausen, Switzerland
Filed May 7, 1965, Ser. No. 454,017
Claims priority, application Austria, May 5, 1964, A 4,307/64
1 Claim. (Cl. 19—149)

ABSTRACT OF THE DISCLOSURE

A machine for the production of cylindrical cotton bodies, particularly suitable for producing dental tampons or the like of high quality, having means for furnishing a cotton layer to a mechanism for separating the cotton layer into individual cotton strips of predetermined length, winding means cooperating with said separating means for winding said individual strips into substantially cylindrical cotton bodies, after-treating and final-calibrating means receiving said substantially cylindrical bodies from said winding means for applying glue to the surface of the cylindrical bodies and for finally calibrating these bodies by pasting flat any standing fibres, and transport means for receiving said glued bodies and conveying them through a drying compartment.

---

Figure 1:
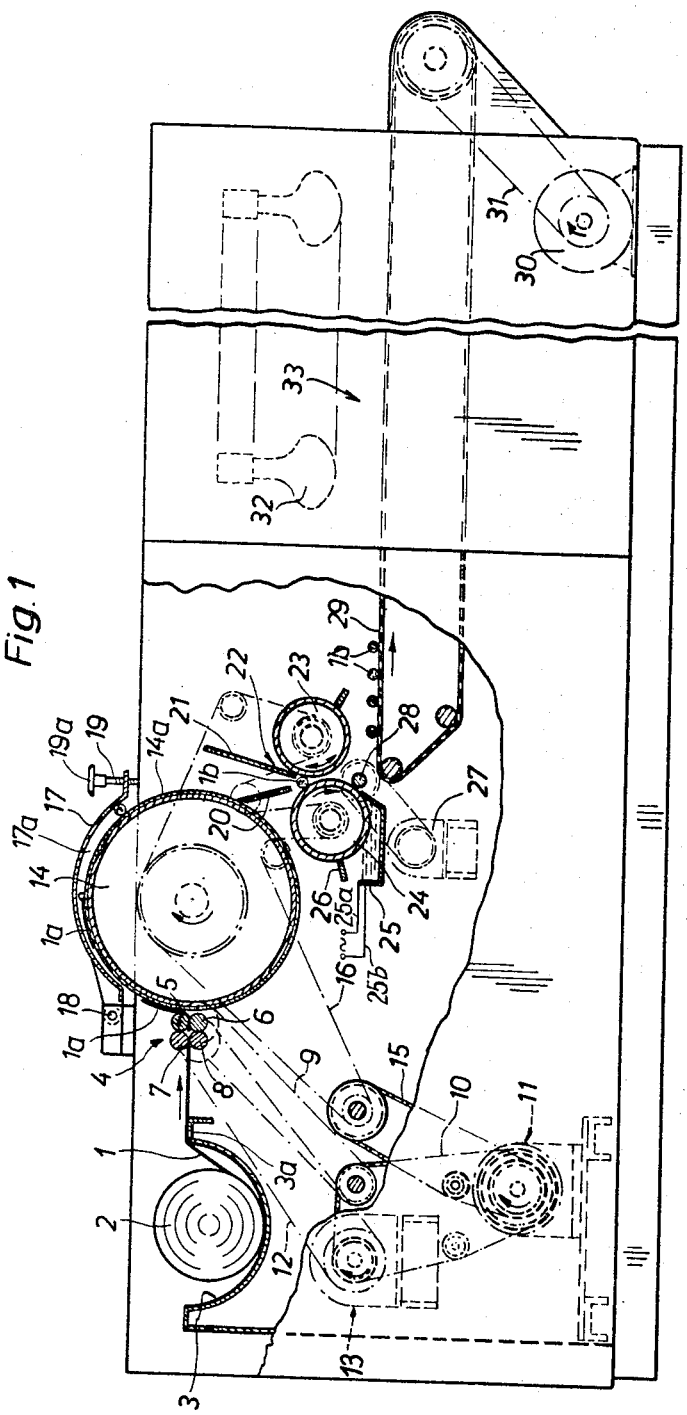

The present invention has reference to an improved machine for the production of cylindrical cotton bodies, particularly dental tampons or plugs, wherein a layer of cotton or the like is delivered to the inventive machine for further processing.

Machines of this type which are presently known to the art must separate the cotton layer into individual strips prior to introduction into the machine. These strips are then successively delivered to the machine and to a winding apparatus. This technique has proven to be extremely complicated and time-consuming. Additionally, an economically feasible solution is greatly needed which enables subsequently changing the size of the cylindrical cotton body wound in the apparatus. Moreover, the change-over of such a machine to bodies with different diameters is cumbersome and time-consuming.

Accordingly, it is a primary object of the present invention to provide an improved machine for the production of cylindrical fibrous bodies, such as cotton bodies, which effectively overcomes the previously mentioned disadvantages.

A further important object of the present invention resides in the provision of an improved machine for the production of cylindrical cotton bodies or the like which is highly efficient and economical in operation, processes the cotton layer into individual strips of predetermined length directly at the machine, positively and reliably winds such strips into cylindrical bodies, as well as subsequently calibrates the size of the wound cylindrical bodies.

In order to implement these and still further objects of the invention, the inventive machine for the production of cylindrical cotton bodies or the like according to a preferred manifestation comprises means for separating a cotton layer into individual strips of predetermined length, winding means cooperating with said means for separating the cotton layer into individual strips, said winding means incorporating a winding drum and a cover member which is adjustable with respect to the winding drum and encircles the latter over a portion of its circumference, with said strips being rolled between said winding drum and said cover member. Additionally, the inventive machine incorporates an after-treating and calibrating mechanism for the rolled strips which cooperates with said winding drum, and transport means for the finished cotton bodies for transporting the latter through a drying compartment.

It will be appreciated that according to an important aspect of the present invention the cotton layer is separated into the aforementioned strips by the machine itself. Adjustment of the cover member for the winding drum brings about a change in the width of the gap or space formed between winding drum and cover member, thus enables changing the diameter of the cylindrical cotton bodies to be produced. A further possibility of adjustment is provided by the feature that it is possible to exchange the cover member for cover members of different lengths. Finally, it is possible to still correct for the desired diameter of the cotton bodies at the after-treatment and calibrating mechanism arranged after the winding means.

Advantageously, the separating means for the cotton layer comprises two pairs of rollers, both rollers of each pair are arranged in superimposed relation. The first pair of such rollers is brought to standstill at desired time intervals for a short period of time by means of a coupling and brake mechanism, and the second pair of rollers closest to the winding drum is continuously driven, the strips being severed between the respective revolving and the from time to time stationary pairs of rollers.

Furthermore, the after-treatment and calibrating mechanism which can be operably associated via guide means or plates with the winding drum, preferably is composed of a calibration roller and a glueing roller which rotate with different speeds of rotation. Due to this arrangement the rolled cotton strip is calibrated and at the same time its surface is finished with glue in order to paste flat any possible standing or protruding fibers.

Figure 2:
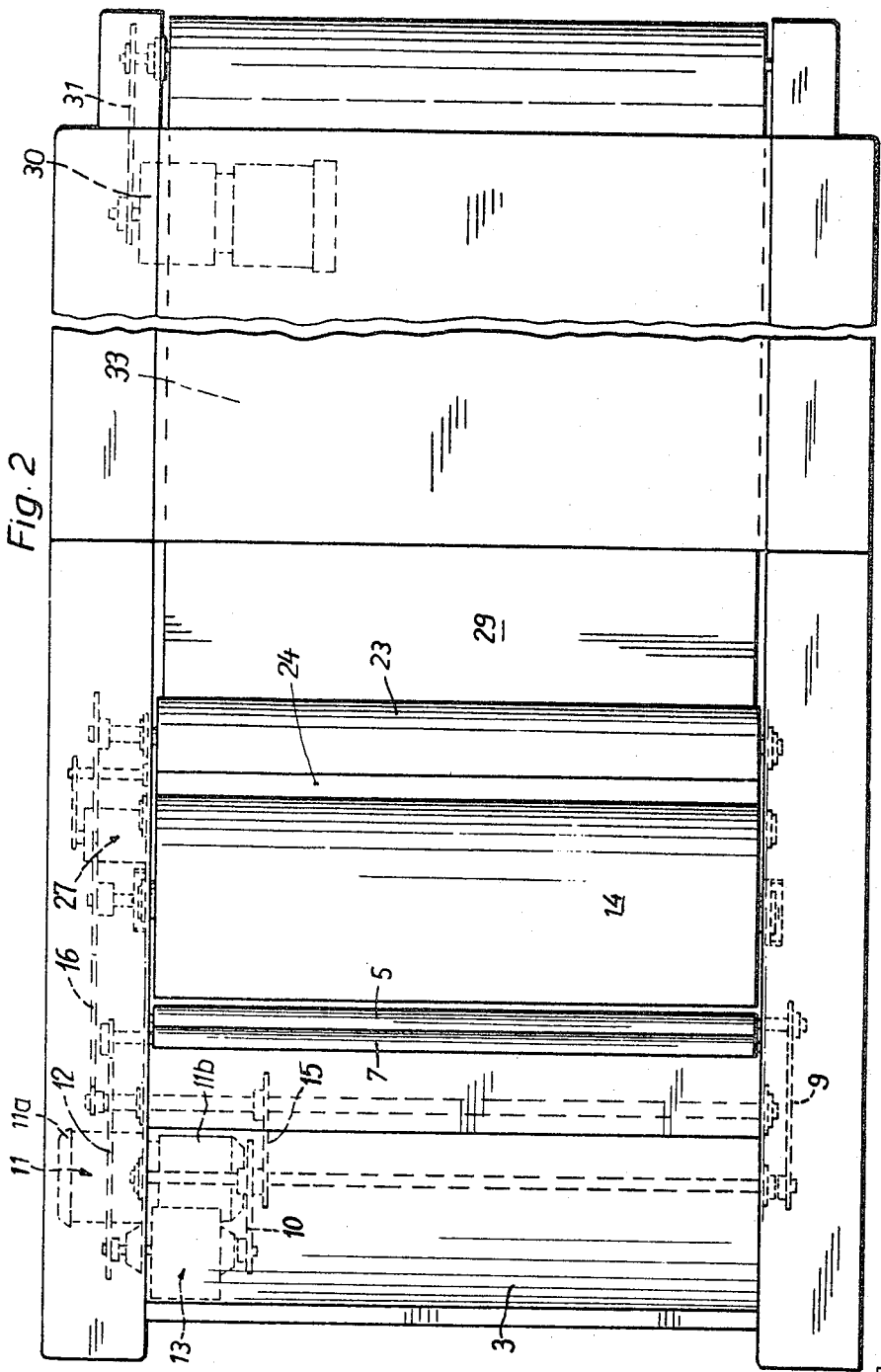

Other features, objects and advantages of the invention will become apparent by reference to the following detailed description and drawings in which:

FIGURE 1 schematically illustrates in side view and partly in cross-section the basic construction of a preferred embodiment of inventive machine for the production of cylindrical cotton bodies; and FIGURE 2 is a top plan view of the machine depicted in FIGURE 1 with the cover member for the winding drum removed.

Describing now the drawings, it will be appreciated that as fiber pattern or arrangement for the production of cylindrical cotton bodies, in the present instance assumed to be dental tampons or pads, there is utilized a cotton layer 1 of bleached cotton, a mixture of cotton and synthetic wool made of cellulose or a sandwiched layer formation of artificial cotton and cotton. It will be understood that the cotton is always located at the underface, i.e. at the side which later must come into contact with the winding drum 14.

As shown in the views of FIGS. 1 and 2, the cotton layer 1 or otherwise is payed-off a supply roll 2. The width of this cotton layer 1 can amount to as much as one meter for instance. Additionally, it must possess a certain weight per square meter, depending upon the material. The supply roll 2 is freely arranged in a semi-cylindrical reservoir or trough 3 provided for this purpose. The cotton layer 1 moves in a predetermined direction of travel from the edge 3a of the trough 3 to a separating means or mechanism, generally designated by reference numeral 4. Separating means 4 serves to separate the cotton layer 1 into individual cotton strips 1a of desired length.

Specifically, separating means 4 comprises two pairs of rollers 5, 6 and 7, 8. The pair of rollers 5, 6 arranged downstream with respect to the direction of movement of the cotton layer 1 and closest to the winding drum 14 is continuously driven from a main drive unit 11 through the agency of a suitable chain drive 9, 10 for instance. The other pair of rollers 7, 8 located upstream with respect to the rollers 5, 6 and the direction of movement of the cotton layer 1 is driven from the main drive unit 11 via the chain drive 10, 12, yet such pair of rollers 7, 8 is always brought to standstill for a short period of time and at desired time intervals by means of the intermediately arranged coupling and braking means 13. The main drive unit 11 is basically composed of an electric motor 11a which under certain circumstances has operably coupled therewith a reduction drive unit generally indicated at 11b. Separation or tearing-up of the cotton layer 1 into individual cotton strips 1a thus occurs between the revolving and the from time to time stationary pairs of rollers 5, 6 and 7, 8 respectively. The employed coupling and braking means 13 preferably operates magnetically and is known to the art and readily available on the market. This coupling and braking means 13 is advantageously controlled by a suitable transistor circuit in such a manner that the length of the severed cotton strips 1a after the subsequent winding or rolling-in operation approximately results in the desired diameter of the cylindrical cotton bodies 1b. Details of the transistor circuit have been omitted since such does not constitute part of the subject invention, and furthermore, any arrangement which will result in a desired periodic arresting of the pair of rollers 7, 8 can be employed.

The torn-off cotton strips 1a are then successively delivered to the winding drum 14 by means of the continuously revolving pair of rollers 5, 6. Winding drum 14 is advantageously provided with a special adhering layer or covering generally schematically depicted at 14a, for example a roughened covering. This winding drum 14 is likewise rotatably driven by the main drive unit 11 arranged in the lower portion of the machine through the agency of the chain drive means 15, 16. A guard or cover member 17 which encircles in spaced relation a portion of the circumference of the winding drum 14 to provide a wind-up compartment or space 17a therebetween is pivotably connected at a shaft member 18. The width of the space 17a formed between the winding drum 14 and the cover member 17 can be altered by means of a threaded spindle 19 provided with a handwheel 19a.

As should now be readily apparent, rolling-in or winding-up of the cotton strips 1a takes place in the wind-up space 17a between the winding drum 14 and the cover member 17 and due to frictional contact of such cotton strips with the aforesaid cover member. Additionally, the diameter of the cotton bodies 1b which are to be manufactured is dependent upon the length of the roll-up path defined by the cover member 17. For this purpose, then, it is possible to replace the existing cover member 17 with a longer cover member for the production of large body members, and the new cover member can be quickly and simply exchanged for the momentarily mounted cover member.

The cotton bodies 1b, which have been roughly rolled in the space of 17a between the winding drum 14 and the cover member 17 to substantially the desired diameter but presenting still some irregularities in size and having standing fibres making the bodies useless for dental practice, fall via guide means or plates 20, 21 or equivalent structure into an after-treating and calibration mechanism 22. Mechanism 22 is composed of a calibration roller 23 and a glueing roller 24 which are likewise driven by the main drive unit 11 via a chain drive arrangement 15, 16 with different circumferential speeds. In so doing, the rolled-in cotton strip 1b is guided between both of the rollers 23 and 24 and is calibrated to a predetermined final diameter which is depending on the width of the gap between rollers 23 and 24. Eventual irregularities of size are equalized. At the same time the entire surface of the rolled-in cotton strip is finished with glue in order to paste flat any standing fibers.

The gluing roller 24 is advantageously immersed in an electrically heated gluing vat or vessel 25, the current supply lines for which are schematically indicated at 25a and 25b. Furthermore, a wiper or stripper plate 26 is provided for the gluing roller 24 which determines the thickness of the layer of glue appearing at the periphery or surface of the gluing roller 24.

A stripping-off roller 28 driven with high speed of rotation by a separate electric motor 27 near the surface of gluing roller 24 and having the same direction of rotation as gluing roller 24 removes the cylindrical body members 1b from roller 24, to which they may adhere due to the glue and finally throws the finished cylindrical body members 1b formed in the previously described manner onto a transport device, a conveyor band 29 for instance. This conveyor band 29 driven by a further electric motor 30 via the chain drive 31 guides the finished cotton bodies through a drying compartment or channel 33 heated by infra-red lamps 32 for instance, and prior to such thus produced cotton bodies 1b being removed from the other end of the machine where they are packaged.

While there is shown and described present preferred embodiment of the invention it is to be distinctly understood that the invention is not liimted thereto but may be otherwise variously embodied and practised within the scope of the following claims.

What is claimed is:

1. Machine for the production of substantially cylindrical cotton bodies or the like, particularly dental tampons, comprising means for separating a cotton layer to be further processed into individual cotton strips of predetermined length, winding means cooperating with the separating means and comprising a winding drum, a cover member encircling in adjustably spaced relation the winding drum over a portion of its circumference to form a winding space between the winding drum and the cover member in which the cotton strips are wound into the substantially cylindrical cotton bodies, after-treating and calibrating means positioned to receive the substantially cylindrical cotton bodies from the winding means, drying means forming a drying zone, and transport means for conveying the wound calibrated substantially cylindrical bodies through the drying zone, said after-treating and calibrating means incorporating a gluing roller and a calibrating roller defining a gap therebetween, drive means for driving said gluing roller and calibrating roller with different circumferential speeds in order to pass therebetween the said wound cylindrical cotton bodies for calibrating the latter and simultaneously applying glue to the surface thereof in order to paste flat any standing fibres, and a stripping-off roller cooperating with said gluing roller behind the said gap formed between said gluing roller and calibrating roller for throwing the after-treated and calibrated cylindrical cotton bodies onto a transport means for conveying said cylindrical bodies into said drying means, said stripping-off roller being driven at very high speed and in the same direction with respect to said gluing roller.

References Cited

UNITED STATES PATENTS

| | | | |
|---|---|---|---|
| 1,755,109 | 4/1930 | Fortier | 19—149 X |
| 2,037,233 | 4/1936 | Heyer | 19—149 |
| 2,407,548 | 9/1946 | Goldman | 19—161 X |
| 2,754,549 | 7/1956 | Torrent | 19—149 |
| 3,065,505 | 11/1962 | Pratt et al. | 19—144.5 |

MERVIN STEIN, *Primary Examiner.*

DORSEY NEWTON, *Examiner.*